United States Patent Office 3,290,341
Patented Dec. 6, 1966

3,290,341
PROCESS FOR PREPARING VITAMIN A FATTY ACID ESTERS
William E. Stieg, Uncasville, and Joseph A. Kardys, Groton, Conn., assignors to Chas. Pfizer & Co., Inc., New York, N.Y., a corporation of Delaware
No Drawing. Continuation of application Ser. No. 761,675, Sept. 18, 1958. This application May 14, 1963, Ser. No. 280,442
2 Claims. (Cl. 260—410.9)

This invention is concerned with a process for preparing esters of vitamin A, and with certain novel products thereby obtained.

The present application is a continuation of our co-pending U.S. patent application Serial No. 761,675, filed September 18, 1958, now abandoned.

Esters of vitamin A, that is, esters of vitamin A alcohol with alkanoic or alkenoic acids having up to about 22 carbon atoms in the chain, are especially useful forms of the vitamin. Particularly, the longer chain compounds have high solubility in fats, are excellently stable on storage, and are readily incorporated into various pharmaceuticals, human foods or animal feeds. For these reasons, they are preferred to vitamin A alcohols for therapeutic and other commercial uses.

In one method for the manufacture of synthetic vitamin A, the acetate or, if preferred, another lower alkanoic acid ester, is obtained as an end product. This type of compound has been converted to the desirable long-chain fatty acid esters by saponification and re-esterification, for example, with a long-chain fatty acid chloride. Such a process has a number of deficiencies. The use of the long-chain fatty acid chlorides is particularly unsatisfactory since they are highly corrosive compounds and are unstable, readily hydrolyzing in the presence of moisture with the evolution of hydrogen chloride. A process which would avoid this and other difficulties of known procedures would obviously be of considerable value.

This invention provides such a process. Broadly speaking, the present novel method involves interesterifying vitamin A alcohol with long chain aliphatic non-vitamin esters. The interesterification is achieved by contacting the vitamin with a long-chain aliphatic ester of an alkanoic or alkenoic acid in the presence of an alkaline catalyst, preferably under substantially anhydrous conditions. Complex mono-esters of fatty esters and the like are thus obtained, and by a process which is much more direct and simpler than the conventional methods.

In one preferred embodiment of this invention, vitamin A is reacted with a long-chain fatty acid ester with which it is desired to form a new vitamin A ester. The reaction is conducted at a mildly elevated temperature to accelerate the process, under substantially anhydrous conditions to minimize undesirable side reactions and in the presence of an alkaline interesterification catalyst, particularly an alkali metal or alkaline earth metal compound. The desired vitamin A-fatty acid ester is recovered as the product.

The elevation of temperature of the reaction mixture assists in forming a completely liquefied system which is homogeneous and more readily stirred. Certain of the pure esters are solids at room temperature. A range of temperature of from about 20° C. to about 80° C. is most suitable for the reaction.

It has been found most important, in order to achieve interesterification at practical rates, to have present in the reaction mixture an alkaline catalyst, preferably an alkali metal or alkaline earth metal compound or the alkali metal itself. The compound chosen is desirably in the form of an alkoxide, oxide, or hydroxide, for example, sodium hydroxide, potassium hydroxide, lithium hydroxide, barium hydroxide, calcium hydroxide, calcium oxide, barium oxide, sodium methoxide, lithium methoxide, potassium ethoxide, barium methoxide, calcium methoxide, magnesium isopropoxide, and so forth. Of the alkali metals, a particularly useful catalyst is an alloy of sodium and potassium containing from 50% to 15% sodium and from 50% to 85% potassium which is liquid below 50° C. A 50–50 sodium potassium alloy is particularly suitable. The catalyst need only be used in a low proportion, e.g., 0.20 mole per mole of the vitamin A reactant or less (substantially between 0.01 and 0.1 mole per mole of the vitamin is generally enough). It is important that good contact of the catalyst and reactants be obtained, and efficient mechanical agitation is normally maintained for this purpose. The catalyst may be added as a solution or as a suspension in a suitable solvent such as a lower alcohol. This assists in improving distribution of the catalyst throughout the reaction mass. If a solvent is utilized for the addition of the catalyst, then it, too, is removed during the distillation of the ester by-product.

Approximately equimolecular proportions of the long-chain fatty acid ester and the vitamin A starting materials are sufficient for the usual reaction.

In carrying out the process of this invention, the long-chain ester is generally heated in a suitable vessel and, in the case of those esters which are solids, first melted. The vitamin A alcohol is mixed with the other reactant and the catalytic metallic compound is introduced. The mixture is stirred well. It is preferable to dry the reactants before addition of the catalyst so that the desirable anhydrous condition is maintained. Good agitation is necessary to assure sufficient contact of the catalyst and reactants, particularly since certain of the catalysts may have low solubility in the reaction mixtures. The temperature is gradually elevated. Interesterification may take from one hour to several hours, depending somewhat on the temperature, the catalyst and the equipment used. In general, it is best to heat the reaction mixture above about 20° C. but not much above 80° C. Little or no destruction of the active compound occurs even at 80° C. or somewhat more, and high yields of vitamin A long-chain fatty acid esters are still obtained. Although a high boiling organic solvent like an aromatic hydrocarbon may be used, this is not the preferred procedure since it is not essential for high yields and it may increase the difficulty of recovering the compound.

After the reaction has been substantially completed, the product may be dissolved in a suitable solvent, that is, one capable of dissolving the vitamin A long-chain fatty acid ester but yet of a fairly low boiling point for ease of subsequent removal. Examples of useful solvents are benzene, petroleum ether, chloroform, diethyl ether, methylene dichloride, and so forth. The catalyst may then be removed by washing the organic solvent solution with water or with a dilute acid in just sufficient amount to neutralize the alkaline compound. The organic solution may then be dried and the solvent removed to yield the desired long-chain fatty acid ester of vitamin A. It is obvious that toxic materials should not be left in the final reaction mixture or product if the compound is intended for use in nutrition or in therapy.

One particularly valuable embodiment of the present invention resides in forming novel mixtures of edible oil fatty acid esters of vitamin A. These are a new class of compositions, much more oil-soluble than artificially prepared mixtures of the individual pure fatty acid esters. They are formed directly by heating vitamin A with at least about a molar proportion of an edible oil in the presence of an alkaline catalyst. The mixed esters products contain fatty acids of the same nature as those present in the original edible oil forming the esters, i.e., both saturated and unsaturated acids (cis and trans). Thus, vitamin A is contacted with a dry, edible oil or fat, either of animal or vegetable origin, such as corn oil, peanut oil, cottonseed oil, pumpkin seed oil, rape seed oil, sesame oil, menhaden oil, tallow, or other animal fats, in accordance with the operating conditions previously discussed. An especially useful product is obtained when vitamin A is heated with corn oil in the presence of a suitable alkali metal or alkaline earth metal catalyst. Corn oil contains a high proportion of glycerol oleate and linoleate, and part of the vitamin A is converted to the oleate and linoleate, thus considerably increasing the oil solubility of the vitamin. After removal of the catalyst, the mixture may be used as a very convenient source of vitamin A in pharmaceutical preparations, dietary supplements, etc.

As above indicated, it is best to apply heat during the interesterification. The reaction will then quickly reach an equilibrium in which a mixture of the various possible new esters is present.

In preparing these edible oil fatty acid esters of vitamin A, after the reaction mixture has been heated for an hour or two, it best should be cooled and the catalytic material removed by washing with water or methanol containing a lower alkanoic acid, such as acetic, propionic, etc., to neutralize the basic catalyst. In general, heating the mass with agitation at about 45°–70° C. for at least about an hour serves to interesterify an appreciable proportion of the reactants. The product obtained will have a very greatly increased solubility in oil and fats, even though the interesterification is only partial. An excess of oil may be used and the vitamin A mixed esters produced need not be separated therefrom, but may be marketed directly as a solution in oil having excellent stability and value. If desired, sufficient oil may be used to yield a product having a standard potency, such as 500,000 or 1,000,000 units per gram of solution. The product may be readily purified by the method described above.

It is known that methyl and ethyl alcohols have been employed in the purification of vitamin A esters, particularly vitamin A acetate, prepared by the esterification with acid chlorides of vitamin A alcohol which is, in turn, obtained by the saponification of natural sources such as fish oil. It has been surprisingly found that the product of the present process may be best purified by extraction with a lower alkanol, especially methyl or ethyl alcohol. This is indeed surprising since the nature of the contaminants and by-products of the present process substantially differs from those of the prior art process, which latter contaminants include those of the natural source of the vitamin, such as cholesterol and other naturally occurring substances. Best results are obtained when employing the alkanol in a substantially dry state. Of course, the alkanol may contain minor amounts of water without seriously diminishing the efficiency of the purification of the product. Aqueous alkanols may be employed, but the efficiency of the purification may be appreciably lowered. The alkanol extracts out any unreacted vitamin A alcohol and other alcohol-soluble components in the mixture, which include small amounts of methyl esters of the vegetable oil as well as monoglycerides and diglycerides produced from the oil by the reaction. Thus, the residue is substantially freed of such contaminants by this extraction procedure. This is particularly advantageous since the vitamin A alcohol may be recovered and re-utilized. Additionally, the vitamin potency of the resultant product is principally due to the long-chain fatty acid ester so produced and not to the unreacted vitamin A alcohol. Variance of the potency of the present products in vitamin preparations is substantially reduced as these esters are more stable than the vitamin alcohol itself.

The particularly valuable products which are formed by the use of an edible fat or oil in the reaction described above show a high degree of stability as compared to ordinary esters of vitamin A. The materials prepared, for instance, by contacting vitamin A alcohol and at least about a molecular equivalent of an edible oil in the presence of a basic catalyst, are definitely more stable than a solution of a single pure vitamin A ester in the same oil. The stability of these products in aqueous dispersion is particularly outstanding. Such aqueous dispersions of the present products may be prepared by the addition of surfactants, such as polyoxyethylated partial esters of hexitol anhydrides and fatty acids such as lauric, palmitic, stearic and oleic, to an aqueous suspension of the present products. However, even the relatively good stability of these vitamin A products may be definitely enhanced by the incorporation into these oily products of a minor proportion of certain stabilizing agents.

A substantial number of such stabilizing agents have been tested with little or no success, but it has been found that alkylated phenolic or alkylated polyhydric phenolic compounds are useful for this purpose. An unexpectedly high degree of stabilization is obtained by the addition of sufficient amount of these materials, generally less than about 3%, to the new products of this invention. The most suitable proportion of a given agent for a specific composition may be determined with the minimum of testing, using well-known methods of evaluation. In general, the most favorable proportion ranges from about 0.2% to 2.0% by weight based on the vitamin A alcohol content of the product, but certain materials may require more or less than this amount.

The alkyl group of the chosen alkylated phenol or polyhydric phenol has preferably at least about three carbon atoms and not more than about six, and the tertiary-butyl group is particularly useful for this purpose. When a polyhydric phenol derivative, such as a compound related to catechol or hydroquinone is used, it may take the form of a mono-lower alkyl ether. Among the most useful stabilizing agents for the new compositions of this invention are 3-tert.-butyl-4-hydroxyanisole, 2-tert.-butyl-4-hydroxyanisole, 2,6-di-tert.-butyl-4-methylphenol, 2,2'-methylene-bis-(4-methyl-6-tert.-butylphenol), tert.-butyl-meta-cresol, 2,5-di-tert.-butylhydroquinone, structurally related compounds and mixtures of these. It is, of course, necessary to use stabilizers of low toxicity for pharmaceutical preparations. The stabilizer may be added to the novel oil-vitamin A compositions after removal of the alkaline catalyst.

The following examples are given by way of illustration only and are not to be considered as the sole embodiment of this invention. It is to be understood that protection hereof is only to be limited by specific wording of the appended claims.

*Example I*

Two hundred grams of vitamin A alcohol concentrate, assaying at 1,080,000 units per gram, one hundred grams of crystalline vitamin A alcohol and 1,090 grams of corn oil are combined in 100 ml. of hexane and heated to 55°–60° C. Thirty milliliters of 20% sodium hydroxide in dry methanol are then added, and the mixture is stirred and heated at 55°–56° C. under high vacuum for two hours. The mixture is then cooled to 25°–30° C. and 1500 ml. of 95% methanol containing 12 grams of acetic acid are added. After stirring for five minutes and allowing the layers to separate, the lower layer is dropped into 1500 ml. of methanol (95%) containing 5% by volume of a 1% aqueous NaHCO₃ solution. The mixture is stirred, separated and the lower layer is similarly treated with 1500 ml. of methanol (95%)–1% aqueous NaHCO₃ (5%). The insoluble layer is separated and washed with four-1500 ml. portions of methanol. After separation, the alcohol-insoluble product is treated with 1% of butylated hydroxyanisole and butylated hydroxytoluene (1:1 mixture), and is then concentrated under reduced pressure to remove any methanol present. The product obtained weighed 855 grams and assayed at approximately 500,000 units per gram, $n_{20}^D = 1.5110$. The oil product is then diluted with hexane and, if desired, may be decolorized with activated charcoal.

Example II

The procedure of Example I is repeated employing cottonseed oil in place of corn oil with comparable results.

Example III

The procedure of Example I is repeated employing, in place of sodium hydroxide, the following basic catalysts: sodium methoxide, lithium methoxide, potassium ethoxide, barium methoxide, calcium methoxide, magnesium isopropoxide, sodium-potassium metal (1:1) alloy, barium hydroxide and potassium hydroxide with equivalent results.

Example IV

Eighty-one grams of pure crystalline vitamin A alcohol and 409 grams of cottonseed oil are heated to 55–65° C. and 15 ml. of 20% NaOH in methanol are added. A high vacuum is applied while heating and stirring of the reaction mixture is continued for two hours. The mixture after being cooled to room temperature is then quenched with 5 ml. of acetic acid in 500 ml. of 95% methanol (5% water). The mixture is stirred for five minutes and the product layer is separated. The product is further extracted with three-500 ml. portions of methanol, and the combined methanol extracts are then set aside for the recovery of vitamin A alcohol.

The product after being heated at 55–65° C. under high vacuum weighed 370 grams, $n_{20}^D = 1.5030$ and assayed at 621,000 units per gram. The product is odorless and tasteless, and is particularly suited for the preparation of aqueous dispersions.

Example V

The extraction procedure of Example IV is repeated employing ethyl alcohol in place of methyl alcohol with comparable results.

What is claimed is:

1. In the process for the preparation of a mixture of edible oil fatty acid esters of vitamin A, the improvement which consists of contacting vitamin A alcohol with a molecular excess of an animal or vegetable edible oil in the presence of an alkaline inter-esterification catalyst and washing resultant ester fraction with a lower alkanol.

2. A process as claimed in claim 1 wherein the edible oil is of vegetable origin.

References Cited by the Examiner

UNITED STATES PATENTS

| 2,249,525 | 7/1941 | Hickman | 260—410 |
| 2,383,633 | 8/1945 | Trent | 260—410 XR |
| 2,693,435 | 11/1954 | Stieg et al. | 260—410 XR |
| 2,882,286 | 4/1959 | Brokaw | 260—410 |

OTHER REFERENCES

Wright et al.: "A Report on Ester Interchange," Oil and Soap, volume 21, May 1944, pp. 145–148.

CHARLES B. PARKER, *Primary Examiner.*

A. H. SUTTO, *Assistant Examiner.*